United States Patent [19]

Wüst et al.

[11] 4,339,574
[45] Jul. 13, 1982

[54] PREPARATION OF ALKYL CELLULOSE

[75] Inventors: Willi Wüst, Ratingen-Hösel; Hasso Leischner; Wilfried Rähse, both of Düsseldorf; Franz-Josef Carduck; Norbert Kühne, both of Haan, all of Fed. Rep. of Germany

[73] Assignee: Henkel Kommanditgesellschaft auf Aktien, Düsseldorf-Holthausen, Fed. Rep. of Germany

[21] Appl. No.: 165,869

[22] Filed: Jul. 7, 1980

[30] Foreign Application Priority Data

Jul. 18, 1979 [DE] Fed. Rep. of Germany ....... 2929011

[51] Int. Cl.³ .................. C08B 11/02; C08B 11/08
[52] U.S. Cl. ................................. 536/84; 536/96; 536/99; 536/101
[58] Field of Search ............... 536/101, 84, 99, 96

[56] References Cited

U.S. PATENT DOCUMENTS

| | | | |
|---|---|---|---|
| 1,683,682 | 9/1928 | Lilienfeld | 536/101 |
| 2,296,829 | 9/1942 | Barry | 536/101 |
| 2,619,483 | 11/1952 | Wilcox et al. | 536/101 |
| 2,977,355 | 3/1961 | Bradshaw et al. | 536/101 |
| 3,255,071 | 6/1966 | Kleinert | 536/101 |

FOREIGN PATENT DOCUMENTS

| | | | |
|---|---|---|---|
| 458977 | 6/1945 | Belgium . | |
| 496725 | 10/1953 | Canada | 536/101 |
| 1060374 | 7/1959 | Fed. Rep. of Germany | 536/99 |
| 200816 | 11/1924 | United Kingdom | 536/101 |
| 250617 | 5/1927 | United Kingdom | 536/101 |
| 526061 | 9/1940 | United Kingdom | 536/101 |
| 546647 | 7/1942 | United Kingdom . | |
| 625962 | 7/1949 | United Kingdom | 536/101 |
| 385453 | 8/1973 | U.S.S.R. | 536/91 |

OTHER PUBLICATIONS

Comptes Rendus Hebdomadaires des Seances De l'Academie des Sciences, Band 238, 1954 Paris, France, pp. 1318–1320.

Primary Examiner—Ronald W. Griffin
Attorney, Agent, or Firm—Hammond & Littell, Weissenberger and Muserlian

[57] ABSTRACT

This invention is directed to a method for the continuous production of alkyl cellulose by reacting alkali cellulose with alkylating agents in the presence of inert liquids, wherein:
(a) powdered cellulose is reacted with aqueous-alcoholic alkali metal hydroxide solution at temperatures of from about 20° to 80° C. to form alkali cellulose;
(b) oxygen is completely removed from the alkali cellulose reaction mixture of step (a) and the water content is reduced to about 2.5 to 6.0 moles per anhydroglucose unit; and
(c) the reaction mixture from step (b) is reacted with at least a stoichiometric amount, but not more than with a molar excess of up to about 50%, based on the alkali metal hydroxide, of an alkylating agent in an inert liquid boiling at a temperature of from about 80° to 160° C., the reaction being carried out continuously in stirred tanks-in-series with 2 to 10 units.

11 Claims, 1 Drawing Figure

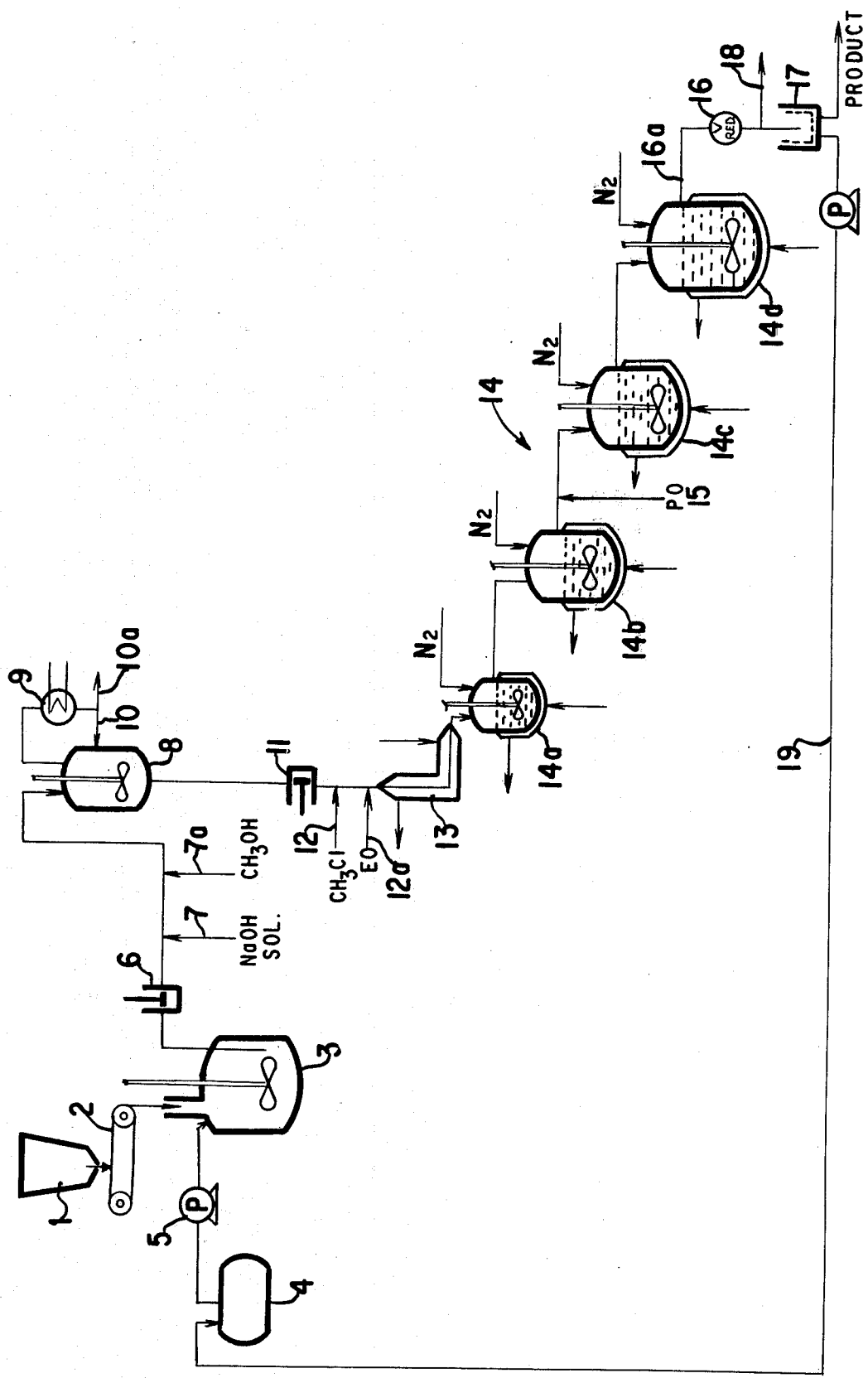

PREPARATION OF ALKYL CELLULOSE

FIELD OF THE INVENTION

This invention relates to the preparation of alkyl cellulose. More particularly, this invention relates to the preparation of alkyl cellulose whereby finely-divided alkali cellulose is reacted with one or more alkylating agents.

BACKGROUND OF THE INVENTION

It is known to produce methyl cellulose and mixed ethers thereof discontinuously in reaction vessels where first alkali cellulose is obtained by steeping cellulose fibers or chips in aqueous alkali metal hydroxide solution and then reacting the alkali cellulose with excess methyl chloride after squeezing and coarse crushing. The reaction itself takes from about 2 to 3 hours according to this method, exclusive of the heating time, and thus one charge or production run takes a total of from about 4 to 5 hours.

Substantially shorter residence times can be obtained in continuous methods, such as is disclosed in German Published Application (DAS) No. 15 43 136. The alkali cellulose can be produced, just as in the discontinuous method, by dipping and mashing cellulose fibers or chips in aqueous sodium hydroxide solution and pressing the resulting pulp mixture or by mixing cellulose powder and aqueous sodium hydroxide solution. The reactor consists of a tube containing a screw worm. The alkali cellulose is reacted with an about 6-fold excess of methyl chloride at a temperature of 75° to 85° C. and a pressure of about 25 bar, and is advanced through the reaction chamber as it reacts. The heat of reaction can be eliminated by direct evaporation of excess methyl chloride. The reaction in the reaction mixture, which is primarily solid, is substantially isothermal.

A substantially continuous method is disclosed in German Published Application (DOS) No. 26 36 935. According to the method, a suspension of a finely-divided polysaccharide (cellulose), an aqueous alkali metal hydroxide solution, and at least one etherification agent is prepared in a suspension vessel under pressure. The suspension, to which an inert diluent can be added, is then introduced substantially continuously into a tubular reactor. This method also works with a 5- to 10-fold excess of methyl chloride. During the reaction the pressure is about 20 bar, while the reaction time is from 10 to 60 minutes. However, there is a great demand for mixed ethers of methyl cellulose, and, according to the state of the art, no such mixed ethers of methyl cellulose can be obtained in this continuous operation.

OBJECTS OF THE INVENTION

It is an object of this invention to provide a method for the preparation of alkyl cellulose.

It is also an object of this invention to provide an improved method for the continuous production of alkyl cellulose.

It is a further object of this invention to provide alkyl cellulose having improved properties.

These and other objects of the invention will become more apparent in the discussion below.

DESCRIPTION OF THE DRAWING

The Drawing is a schematic representation of one embodiment of the process of the invention.

DESCRIPTION OF THE INVENTION

Applicants have surprisingly developed a method of preparing alkyl cellulose, i.e., alkyl ethers of cellulose, in a continuous manner whereby the alkyl cellulose has improved properties. According to the invention, alkyl cellulose is prepared in the following manner:

(a) alkali cellulose in an inert organic liquid is prepared from powdered cellulose by reaction with an aqueousalcoholic alkali metal hydroxide solution at temperatures of from about 20° to 80° C., preferably from about 30° to 60° C.;

(b) oxygen is removed after the formation of the alkali cellulose and the water content is reduced to from about 2.5 to 6.0 moles, preferably from about 3.5 to 4.0 moles, per anhydroglucose unit; and (c) the alkali cellulose is alkylated with an at least stoichiometric amount, but not more than a molar excess of up to 50% (based on the alkali metal), of an alkylation agent in an inert liquid boiling at a temperature of from about 80° to 160° C., the alkylation being carried out continuously in stirred tanks connected in cascade comprising from 2 to 10 units.

According to the method of the invention, it is preferred that a cellulose powder is used which has a mean particle size diameter of from about 20 to 120$\mu$, preferably from about 40 to 60$\mu$. The powder should have a degree of polymerization (DP) value of from about 600 to 1600, depending on the type of cellulose used. The higher the DP value is, the higher will be the viscosity of an aqueous solution of the ether prepared from this cellulose. The use of other cellulose forms, such as chips or fibers, is also possible but requires more liquid for transporting the suspension formed.

The aqueous-alcoholic sodium hydroxide solution used for the alkalization should have an alkali metal hydroxide content of from about 30 to 60%. It has been found particularly advantageous to dilute aqueous sodium hydroxide solution with lower monoalcohols, especially lower alkanols such as methanol, ethanol and/or isopropanol, and to then at least partially distill off the diluent prior to the actual alkylation etherification phase.

For practical reasons the entire reaction, that is, both the alkalization and the alkylation, is carried out in an inert liquid. This procedure is particularly suitable to produce a homogeneous reaction product. Useful inert liquids include organic solvents, such as aliphatic hydrocarbons having from 6 to 12 carbon atoms, and especially aromatic hydrocarbons, such as toluene or xylene, or mixtures thereof. The use of ethers, such as dipropylether or 1,4-dioxane, as well as ketones and secondary or tertiary alcohols is possible. Preferably the inert organic solvent is immiscible with water. The use of such inert solvents for carrying out the reaction is known per se. According to the invention, the suspenion is produced to provide a transport vehicle for the solid substance. The production of the suspension is significant because it is thus possible to carry out the entire process continuously.

To avoid oxidative decomposition of the cellulose, it is advisable to remove adhering and bound oxygen as early as possible. This can be done, for example, after the production of the alkali cellulose, under reduced pressure, preferably with boiling solvent. The viscosity of the end product can be determined within certain limits by the intensity of the degassification. The alkalization of the finely-divided powdered cellulose takes place in the suspension within a few seconds to a few minutes and depends on the temperature, the alkali metal hydroxide solution used, and the alcohol used. By adjusting the amount of simultaneous dehydration, it is possible to adjust the degree of substitution (n) under otherwise constant conditions, as desired, for example, within the limits of $n=1.1$ to 1.7.

After the alkalization is complete, the etherification is effected at a specific temperature for the reactants used. Useful alkylating agents include alkyl halides, such as methyl chloride, ethyl chloride, ethyl bromide, allyl bromide, bromoacetic acid, chloroacetic acid, and their alkali metal salts, preferably the potassium or sodium salts, as well as dichloroacetic acid, alkylene oxides, such as ethylene oxide, propylene oxide, butylene oxide, or mixtures of said compounds. It is, of course, also possible to use different alkylating agents simultaneously.

Since the reaction is carried out in a stirred tank reactors in series, the temperature and pressure can be set individually in each vessel. Due to the highly reactive alkali cellulose power and the dispersing agent used according to the invention, it is possible to carry out the reaction mostly with substantially equi-molar amounts of alkyl halide (based on the alkali metal hydroxide) or with a very slight excess (up to about 30%) and to obtain technically valuable products. It is possible to use larger amounts of alkylating agents; however, such use would not result in any major advantages.

The method according to the invention can be better understood by making reference to the production of methylhydroxyethyl cellulose as represented by the Drawing. In the Drawing, very fine cellulose powder from silo 1 is conveyed via dosing conveyor-type weigher 2 to mashing vessel 3. The suspension is produced by the simultaneous controlled addition via pump 5 of toluene as an inert solvent from tank 4, under stirring. The suspension is delivered by metering pump 6 into vacuum vessel 8. On the downstream side of metering pump 6 an aqueous/methanolic sodium hydroxide solution is dosed in via lines 7 and 7a. The sodium hydroxide solution has an alkali metal hydroxide content of from about 15 to 70%, preferably from about 30 to 40%. Alkali cellulose is formed in a few seconds. Degassification and dehydration take place in a vacuum vessel 8, and the evaporating liquids are condensed in a heat exchanger 9. The condensate is partially returned to vessel 8 via line 10 and the water/alcohol mixture is removed via line 10a.

It has been found that the degree of substitution is increased with increasing withdrawal of water and methanol. The degassed alkali cellulose-toluene suspension is pumped in via-metering pump 11 into reaction system 14 after the addition of methyl chloride and ethylene oxide (EO) through lines 12 and 12a, respectively. After the suspension has passed through heating zone 13, the ethylene oxide has already partly reacted. The temperature of the suspension is raised by heating to the extent that the methylation reaction starts immediately in the reactors.

Reaction system 14 consists of individual agitator vessels 14a to 14d, which are connected with each other in cascade form. The reaction is preferably carried out in the cascade so that the volume and the temperature of each vessel increase with progressing reaction. If desired, propylene oxide can be introduced via line 15 in liquid form at any point of the cascade, preferably after the second vessel. The individual vessels are pressurized with nitrogen.

The cellulose powder-toluene suspension consists of one part by weight of cellulose and from about 8 to 14 parts by weight of toluene. Preferably the weight ratio, called the liquor ratio, is about 1:10.

Due to the particular structure of the cellulose powder, the alkalization with the from about 30 to 40% aqueous/methanolic sodium hydroxide solution is spontaneous. The coefficient of turbidity of the products is reduced due to the addition of methanol.

It has been found that pressurization with nitrogen or a noble gas or injection of same into the mashing vessel 3, or the expulsion of the dissolved oxygen from the sodium hydroxide solution, are not alone sufficient to obtain products of the highest quality. Only by additional degassification according to the invention, such as in vessel 8, can oxidative decomposition be prevented in practice. Oxygen adhering to the cellulose powder can also be removed substantially this way.

The degassification can be enhanced by applying a vacuum, which effectively expels the air or oxygen from the boiling suspension liquid. It is possible to work successfully at a temperature of from 25° to 85° C. and at a pressure of from about 0.06 to 1 bar. A slight underpressure in the degassing vessel is advisable.

Liquid boiling during the degassification is condensed in condenser 9 while the atmospheric oxygen leaves the system via the vacuum pump (not shown). The condensate contains water, which is at least partly separated. If water is added again to the reaction mixture, the degree of substitution decreases. With intensive degassification and dehydration it is readily possible to obtain a degree of substitution (DS) of up to about 1.7 (Ds-methoxyl).

The agitator vessel cascade itself consists of from 2 to about 6 individual, ideally mixed vessels arranged in series. It is advisable to use 4 to 5 vessels. Furthermore, it has been found expedient to make each vessel after the first vessel about twice the size of the preceding vessel.

The combination according to the invention also yields good products if other volumetric ratios of the vessels are selected. However, the above-described embodiment has proven to be an economically feasible solution with particularly good results.

The temperatures in the vessels are set differently, depending on the test conditions. A typical temperature combination is the following: first vessel 90° C., second vessel 106° C., third vessel 115° C., and fourth vessel 125° C. At these temperatures an excess pressure of from 6 to 9 bar is built up, which is adjusted to be equal in all vessels to ensure unpressurized flow of the suspension from one vessel to another. Since the heat of reaction is eliminated in this method only through the reactor wall and not by evaporation of the methyl chloride, the vessels can also be pressurized with nitrogen. This prevents large amounts of methyl chloride from getting into the steam chamber. Due to the excess pressure it is possible to increase (i) the methyl chloride concentration in the solvent and (ii) the reaction velocity. In this way the residence time in the reactor system can be reduced.

The mean residence time in the cascade during the production of methyl-hydroxyethyl cellulose, or methyl cellulose, are from about 10 to 50 minutes, preferably from about 20 to 30 minutes.

Replacement of reaction vessel cascade 14 by a column divided into chambers (compartment reactor) is possible. This equivalent embodiment can be even more economical under certain conditions. The subdivision of the column into sections permits separate cooling or heating of individual compartments, similar to the cascade. To obtain good results, the number of chambers in the column should be at least 4.

After the reaction is complete, the pressure of the atmosphere in the last vessel, vessel 14d, is reduced by withdrawing reaction mixture through line 16a to pressure reducer 16. Subsequently the reaction mixture is centrifuged in centrifuge 17 to separate suspended particles from solvent. Solvent is returned to storage vessel 4 via line 19, and product, the alkyl cellulose, is removed at 20. Purification of the solvent by steam distillation is possible but is only economical in a few instances.

According to the method of the invention, the suspension liquid or solvent to be recirculated has a high boiling point, while in presently used methods large amounts of liquid gas (boiling point: −23.9° C.) must be separated, worked up, and circulated. With equimolar amounts of methyl chloride, dimethyl ether, which is formed from the competing secondary reaction between methanol and methyl chloride, is passed out in gaseous form via line 18. In case of a slight excess of methyl chloride, unreacted methyl chloride escapes at this point. The amounts of methyl chloride and dimethyl ether in waste gas existing at line 18, which are of about the same order of magnitude, are worked up in this case according to known methods.

The pipe lines traversed by the suspension are selected according to certain criteria: on the one hand, the linear velocity of the suspension is at least three times higher than the sinking velocity of the particles, and, on the other hand, the specific pressure loss must be at a minimum or very close to it. If these principles are observed, a trouble-free conveyance in the entire system is possible, even at typical liquor ratios of only from about 1:9 to 1:11. The reduction of the amount of liquid to be circulated to the about 10-fold value of the amount of cellulose, as well as the simple and inexpensive workup of the relatively high-boiling inert liquid, permit low-cost production of the cellulose ethers.

The molar ratio of sodium hydroxide to anhydroglucose, designated α, was between 1.5 and 5 in the tests. Starting from α=2, high-quality products are obtained according to this method. Preferably the molar ratio of the charge should be close to the stoichiometric ratio (α≈3).

According to the method of the invention, the reaction can be carried out without excess methyl chloride, that is, with use of equimolar amounts of sodium hydroxide and methyl chloride. For some purposes, however, it is advisable to use a slight molar excess of methyl chloride of up to 50%, preferably of from about 10 to 30%.

The methyl cellulose is generally separated of common salt (NaCl) by washing with hot water. However, for mixed ethers, other known separation methods must be used, such as washing with water under pressure, cross-linking and washing in cold water, and the like.

The wet cellulose ethers can be subsequently dried. They are then available in usable form.

In the production of cellulose ethers in powder form, a certain amount of common salt should remain in the product to prevent agglomeration during workup and drying. Generally an amount of from about 0.5 to 3% by weight, based on the weight of the cellulose, will be effective. However, the limits for the common salt content can be lowered or raised in certain cases so that a range of from about 0.05 to 10% by weight of NaCl is customary in actual use. For this range of NaCl content, the powdered cellulose ether is obtained directly as described above, for the process set forth in the Drawing, without the necessity of grinding or de-agglomeration. Highly active fine dusts (max 10% > 125μ) can be produced directly, which are preferably used in the building industry).

Normally the viscosity values are from about 6000 to 25,000 mPas, the coefficients of turbidity are from about 25 to 87, and the flocculation points are at or over 70° C.

The following examples are intended to illustrate the invention and should not be construed as limiting the invention thereto.

EXAMPLES

EXAMPLE 1

Fifty-one kilograms of cellulose powder (bone-dry) and 510 kg of toluene per hour were mashed continuously in a vessel. The suspension was withdrawn in equal parts by weight by means of a metering pump. A mixture of 75.5 kg of an aqueous 50% sodium hydroxide solution and 25 kg of methanol was added per hour. As a result of degassification/dehydration, 100 liters of liquid were withdrawn from the system every hour. After addition of methyl chloride (57.2 kg/hr, corresponding to a 20% molar excess) and ethylene oxide (1.4 kg/hr), about 665 liters/hour of the reaction mixture arrived in a heating zone. There the mixture attained a temperature of 87° at the end. The reaction system consisted of stirred tanks-in-series with four individual vessels, where the effective volume of the following vessel was twice the size of the preceding vessel. The total effective volume was 250 liters. Each vessel was equipped with a separately driven stirring system with speed setting and with a separately controllable jacket cooling and heating.

The temperatures in the first to fourth vessels were 92° C., 105° C., 116° C., and 127° C., respectively. The reaction pressure was 9 bar absolute.

After the last vessel in the cascade, the pressure was reduced and the toluene was separated by centrifuging. After washing with hot water, the product was dried to 2% residual dryness. The end product obtained as a fine dust contained 2.5% of common salt and had the following characteristics:

| Viscosity | 15,700 mPas |
| Coefficient of turbidity | 57% |
| Flocculation point | 72° C. |
| Particle size distribution | about 3% > 125 μ |
| Water retention capacity (2 °/oo) | 98.6% |

EXAMPLE 2

The degassing vessel was continuously charged with an alkali cellulose-toluene suspension, which was prepared from 34.4 kg of cellulose powder, 413 kg of toluene, 49.3 kg of aqueous 50% sodium hydroxide solution, and 20 kg of methanol per hour. After degassification and dehydration (about 80 liters/hour) the stoichiometric amount of methyl chloride (31.7 kg/hr) was added. The process was run at temperatures which were on the average 4° to 8° C. above those mentioned in Example 1, and the reaction was determined to be about 95.6% complete. In this example there was a pressurization with nitrogen too, so that the reaction could be increased by 2.2%.

After the product dressing described above, a methyl cellulose with the following properties was obtained:

| | |
|---|---|
| Viscosity | 7,600 mPas |
| Coefficient of turbidity | 86% |
| Flocculation point | 68° C. |
| Particle size distribution | about 2% > 125 μ |
| Water retention capacity (2 °/oo) | 96.8% |

EXAMPLE 3

Example 1 was repeated for 12 hours under the same conditions but with the exception that the amount of ethylene oxide was increased 9-fold.

After the workup a methylhydroxyethyl cellulose was obtained which had the following properties:

| | |
|---|---|
| Viscosity | 20,700 mPas |
| Coefficient of turbidity | 45% |
| Flocculation point | 74° C. |
| Water retention capacity (2 °/oo) | 98.7% |
| Methoxy value | 23.5% |
| Hydroxyethyl value | 10.6% |

EXAMPLE 4

The quantities of the charge mentioned in Example 1 were also used in this example. However, the tanks-in-series were replaced by a stirring column subdivided into 12 chambers. With a column length of 2.5 m and a diameter of 400 mm, this reactor had an effective volume of 295 liters. Judged by its efficiency scale, the column corresponded in its reactive effect to a cascade arrangement with 6 to 7 vessels of equal size. Pressurization with nitrogen was used in this system to set a defined pressure. The column consisted of 3 sections, which could be cooled or heated by a welded-on jacket.

The temperature was 93° C. at the end of the heating zone, 103° C. in the first third of the column, 119° C. in the second third of the column, and 131° C. in the last third of the column. A conversion of 97.8% was achieved with a mean reaction period of 27 minutes.

After the usual dressing, a cellulose ether with the following properties was obtained:

| | |
|---|---|
| Viscosity | 14,500 mPas |
| Coefficient of turbidity | 54 |
| Flocculation point | 73° C. |
| Particle size distribution | about 3% > 125 μ |
| Water retention capacity (2 °/oo) | 98.5% |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A method for the continuous production of alkyl cellulose by reacting alkali cellulose with alkylating agents in the presence of inert liquids, wherein:
    (a) powdered cellulose in an inert organic liquid is continuously reacted with aqueous-alcoholic alkali metal hydroxide solution at temperatures of from about 20° to 80° C. to form alkali cellulose;
    (b) oxygen is continuously completely removed from the alkali cellulose reaction mixture of step (a) and the water content is continuously reduced to from about 2.5 to 6.0 moles per anhydroglucose unit; and
    (c) the reaction mixture from step (b) is reacted with at least a stoichiometric amount, but not more than with a molar excess of up to about 50%, based on the alkali metal hydroxide, of an alkylating agent in an inert liquid boiling at a temperature of from about 80° to 160° C., the reaction being carried out continuously in a cascade of stirred tanks-in-series with 2 to 10 units.

2. The method of claim 1, wherein step (a) takes place at a temperature of from about 30° to 60° C.

3. The method of claim 1, wherein in step (b) the water is reduced to from about 3.5 to 4.0 moles per anhydroglucose unit.

4. The method of claim 1, wherein the powdered cellulose has a mean particle size diameter of from about 20 to 120μ.

5. The method of claim 4, wherein the powdered cellulose has a mean particle size diameter of from about 40 to 60μ.

6. The method of claim 1, wherein the inert organic liquid is toluene, xylene, or a mixture thereof.

7. The method of claim 1, wherein the cascade comprises a series of separate vessels.

8. The method of claim 7, wherein in the series each vessel after the first vessel is larger than the preceding vessel.

9. The method of claim 1, wherein the cascade comprises a column subdivided into chambers (compartment reactor).

10. In the method for the preparation of alkyl cellulose by alkalizing cellulose to form alkali cellulose, alkylating the alkali cellulose to form alkyl cellulose, and recovering the alkyl cellulose,
    the improvement which comprises continuously reacting powdered cellulose in an inert organic liquid with an aqueous-alcoholic alkali metal hydroxide solution at temperatures of from about 20° to 80° C. to form alkali cellulose; continuously removing oxygen from the alkali cellulose reaction mixture and reducing the water content to from about 2.5 to 6.0 moles per anhydroglucose unit; and reacting the reaction mixture with at least a stoichiometric amount, but not more than with a molar excess of up to about 50%, based on the alkali metal hydroxide, of an alkylating agent in an inert liquid boiling at a temperature of from about 80° to 160° C., the reaction being carried out continuously in a stirred cascade reactor with 2 to 10 units.

11. The method of claim 4, wherein the powdered cellulose has a degree of polymerization value of from about 600 to 1600.

* * * * *